(12) United States Patent
Khalfan

(10) Patent No.: US 12,367,484 B2
(45) Date of Patent: Jul. 22, 2025

(54) SYSTEMS AND METHODS FOR EFFECTUATING REAL-WORLD OUTCOMES BASED ON DIGITAL ASSETS OF USERS

(71) Applicant: Disney Enterprises, Inc., Burbank, CA (US)

(72) Inventor: Alif Khalfan, Redwood City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 18/071,059

(22) Filed: Nov. 29, 2022

(65) Prior Publication Data

US 2023/0169492 A1    Jun. 1, 2023

Related U.S. Application Data

(60) Provisional application No. 63/284,484, filed on Nov. 30, 2021.

(51) Int. Cl.
 G06Q 40/00   (2023.01)
 G06Q 20/36   (2012.01)
(52) U.S. Cl.
 CPC ................. *G06Q 20/3674* (2013.01)
(58) Field of Classification Search
 None
 See application file for complete search history.

(56) References Cited

U.S. PATENT DOCUMENTS 1,004,331 A    9/1911  Wright
1,004,624 A   10/1911  Brann
(Continued)

FOREIGN PATENT DOCUMENTS

CN    113193965 B    10/2021
IN    1381KOL2007    4/2009
(Continued)

OTHER PUBLICATIONS

Adam Hartley, 5 Predictions for the Future of in-Car Entertainment, Apr. 9, 2019 [https://360.here.com/5-predictions-for-the-future-of-in-car-leisure-entertainment], (5 pages).
(Continued)

*Primary Examiner* — Olabode Akintola
(74) *Attorney, Agent, or Firm* — Esplin & Associates, PC

(57) ABSTRACT

Systems and methods to effectuate real-world outcomes based on digital assets of users are disclosed. Exemplary implementations may: receive an authentication request including first authentication information from a first user; determine whether the first authentication information is valid by comparing the first authentication information and first access information; determine, responsive to determination that the first authentication information is valid, one or more of the digital assets indicated by a first digital wallet as owned by the first user; determine one or more real-world experiences of the first user; update the experience information correlated with the one or more digital assets owned by the first user as indicated by the first digital wallet in electronic storage based on the one or more real-world experiences; and effectuate real-world outcomes based on the experience information correlated with the one or more digital assets that are owned by the first user.

14 Claims, 3 Drawing Sheets

(56) References Cited

U.S. PATENT DOCUMENTS

| | | |
|---|---|---|
| 5,299,291 A | 3/1994 | Ruetz |
| 5,766,077 A | 6/1998 | Hongo |
| 6,007,338 A | 12/1999 | Dinunzio |
| 6,053,815 A | 4/2000 | Hara |
| 6,200,138 B1 | 3/2001 | Ando |
| 6,691,032 B1 | 2/2004 | Irish |
| 7,081,033 B1 | 7/2006 | Mawle |
| 7,266,847 B2 | 9/2007 | Pauker |
| 7,739,371 B2 | 6/2010 | Ikegaya |
| 7,837,544 B2 | 11/2010 | Tipping |
| 8,078,163 B2 | 12/2011 | Lemond |
| 8,190,295 B1 | 5/2012 | Garretson |
| 8,758,126 B2 | 6/2014 | Bavitz |
| 8,762,227 B1 | 6/2014 | Fox |
| 8,831,228 B1 | 9/2014 | Agrawal |
| 8,882,595 B2 | 11/2014 | Chowdhary |
| 8,894,462 B2 | 11/2014 | Leyland |
| 8,941,690 B2 | 1/2015 | Seder |
| 8,948,541 B2 | 2/2015 | Neville |
| 8,988,465 B2 | 3/2015 | Baron |
| 9,007,400 B2 | 4/2015 | Takahashi |
| 9,008,310 B2 | 4/2015 | Nelson |
| 9,266,018 B2 | 2/2016 | Story |
| 9,293,042 B1 | 3/2016 | Wasserman |
| 9,327,189 B2 | 5/2016 | Bavitz |
| 9,361,730 B2 | 6/2016 | Keating |
| 9,467,515 B1 | 10/2016 | Penilla |
| 9,610,510 B2 | 4/2017 | Comploi |
| 9,643,086 B2 | 5/2017 | Tipping |
| 9,669,302 B2 | 6/2017 | Park |
| 9,674,361 B2 | 6/2017 | Ristock |
| 9,715,764 B2 | 7/2017 | Alaniz |
| 9,744,448 B2 | 8/2017 | Mullen |
| 9,814,991 B2 | 11/2017 | Van Winkle |
| 9,818,228 B2 | 11/2017 | Lanier |
| 9,821,920 B2 | 11/2017 | Cole |
| 9,922,466 B2 | 3/2018 | Donnelly |
| 10,019,070 B2 | 7/2018 | Szczerba |
| 10,025,431 B2 | 7/2018 | Li |
| 10,043,316 B2 | 8/2018 | Donnelly |
| 10,043,999 B2 | 8/2018 | Senoo |
| 10,045,147 B2 | 8/2018 | Dickow |
| 10,046,241 B1 | 8/2018 | Krosky |
| 10,059,347 B2 | 8/2018 | Thieberger-Navon |
| 10,123,155 B2 | 11/2018 | Grover |
| 10,140,464 B2 | 11/2018 | Lebeck |
| 10,162,998 B2 | 12/2018 | Park |
| 10,186,065 B2 | 1/2019 | Anderson |
| 10,310,600 B2 | 6/2019 | Hong |
| 10,339,711 B2 | 7/2019 | Ng-Thow-Hing |
| 10,366,290 B2 | 7/2019 | Wang |
| 10,376,776 B2 | 8/2019 | Lowe |
| 10,423,999 B1 | 9/2019 | Doctor |
| 10,482,669 B2 | 11/2019 | Rober |
| 10,501,053 B2 | 12/2019 | Tokunaga |
| 10,506,092 B1 | 12/2019 | Stephenson |
| 10,572,123 B2 | 2/2020 | Penilla |
| 10,585,471 B2 | 3/2020 | Reichow |
| 10,589,625 B1 | 3/2020 | Goslin |
| 10,639,557 B2 | 5/2020 | Hake |
| 10,785,621 B1 | 9/2020 | Drake |
| 10,841,632 B2 | 11/2020 | Chao |
| 10,969,748 B1 | 4/2021 | Goslin |
| 10,970,560 B2 | 4/2021 | Khalfan |
| 11,076,276 B1 | 7/2021 | Nocon |
| 11,228,436 B1 | 1/2022 | Foley |
| 11,251,978 B2 | 2/2022 | Ingraham |
| 11,369,878 B2 | 6/2022 | Koch |
| 11,605,062 B2 | 3/2023 | Prakash |
| 2001/0025287 A1 | 9/2001 | Okabe |
| 2003/0027636 A1 | 2/2003 | Covannon |
| 2003/0104824 A1 | 6/2003 | Hale |
| 2003/0130031 A1 | 7/2003 | Yoshida |
| 2004/0059922 A1 | 3/2004 | Harris |
| 2005/0021192 A1 | 1/2005 | Takafuji |
| 2005/0059483 A1 | 3/2005 | Borge |
| 2005/0144091 A1 | 6/2005 | Harper |
| 2006/0052153 A1 | 3/2006 | Vlazny |
| 2006/0143270 A1 | 6/2006 | Wodtke |
| 2006/0224456 A1 | 10/2006 | Walker |
| 2006/0277100 A1 | 12/2006 | Parham |
| 2007/0060233 A1 | 3/2007 | Liccardo |
| 2007/0087834 A1 | 4/2007 | Moser |
| 2007/0093299 A1 | 4/2007 | Bergeron |
| 2007/0139671 A1 | 6/2007 | Stevens |
| 2007/0197275 A1 | 8/2007 | Gagner |
| 2007/0206023 A1 | 9/2007 | Street |
| 2008/0091782 A1 | 4/2008 | Jakobson |
| 2008/0105751 A1 | 5/2008 | Landau |
| 2008/0148067 A1 | 6/2008 | Sitrick |
| 2008/0200244 A1 | 8/2008 | Rowe |
| 2008/0309010 A1 | 12/2008 | Bowling |
| 2008/0311983 A1 | 12/2008 | Koempel |
| 2009/0069084 A1 | 3/2009 | Reece |
| 2009/0079705 A1 | 3/2009 | Sizelove |
| 2009/0137323 A1 | 5/2009 | Fiegener |
| 2009/0176566 A1 | 7/2009 | Kelly |
| 2009/0313358 A1 | 12/2009 | Shepherd |
| 2010/0033427 A1 | 2/2010 | Marks |
| 2010/0093421 A1 | 4/2010 | Nyman |
| 2010/0098092 A1 | 4/2010 | Luo |
| 2010/0130296 A1 | 5/2010 | Ackley |
| 2010/0182340 A1 | 7/2010 | Bachelder |
| 2010/0268661 A1 | 10/2010 | Levy |
| 2010/0324984 A1 | 12/2010 | Pelto |
| 2010/0331721 A1 | 12/2010 | Epley |
| 2011/0098092 A1 | 4/2011 | Reiche, III |
| 2011/0183754 A1 | 7/2011 | Alghamdi |
| 2011/0216948 A1 | 9/2011 | Yalla |
| 2012/0089275 A1 | 4/2012 | Yao-Chang |
| 2012/0142415 A1 | 6/2012 | Lindsay |
| 2012/0256945 A1 | 10/2012 | Kidron |
| 2012/0264518 A1 | 10/2012 | Rouille |
| 2012/0289122 A1 | 11/2012 | Elliott |
| 2012/0295703 A1 | 11/2012 | Reiche |
| 2012/0295704 A1 | 11/2012 | Reiche |
| 2013/0030645 A1 | 1/2013 | Divine |
| 2013/0083003 A1 | 4/2013 | Perez |
| 2013/0083061 A1 | 4/2013 | Mishra |
| 2013/0157607 A1 | 6/2013 | Paek |
| 2013/0166147 A1 | 6/2013 | Chudzinski |
| 2013/0274024 A1 | 10/2013 | Geylik |
| 2013/0296058 A1 | 11/2013 | Leyland |
| 2014/0067208 A1 | 3/2014 | Klappert |
| 2014/0100020 A1 | 4/2014 | Carroll |
| 2014/0100029 A1 | 4/2014 | Reiche |
| 2014/0128144 A1 | 5/2014 | Bavitz |
| 2014/0128145 A1 | 5/2014 | Hwang |
| 2014/0129640 A1 | 5/2014 | Ogawa |
| 2014/0162785 A1 | 6/2014 | Reiche |
| 2014/0163771 A1 | 6/2014 | Demeniuk |
| 2014/0189017 A1 | 7/2014 | Prakash |
| 2014/0201004 A1 | 7/2014 | Parundekar |
| 2014/0274313 A1 | 9/2014 | Bala |
| 2014/0295963 A1 | 10/2014 | Ishikawa |
| 2014/0342790 A1 | 11/2014 | Kim |
| 2015/0003609 A1 | 1/2015 | Nelson |
| 2015/0024852 A1 | 1/2015 | Pacey |
| 2015/0065237 A1 | 3/2015 | Hohn |
| 2015/0080125 A1 | 3/2015 | Andre |
| 2015/0097860 A1 | 4/2015 | Alaniz |
| 2015/0097864 A1 | 4/2015 | Alaniz |
| 2015/0100179 A1 | 4/2015 | Alaniz |
| 2015/0134371 A1 | 5/2015 | Shivakumar |
| 2015/0145671 A1 | 5/2015 | Cohen |
| 2015/0174479 A1 | 6/2015 | Reiche |
| 2015/0202962 A1 | 7/2015 | Habashima |
| 2015/0269780 A1 | 9/2015 | Herman |
| 2015/0294505 A1 | 10/2015 | Atsmon |
| 2015/0339910 A1 | 11/2015 | Stenzler |
| 2015/0346722 A1 | 12/2015 | Herz |
| 2015/0363092 A1 | 12/2015 | Morton |
| 2016/0005070 A1 | 1/2016 | Burr |
| 2016/0042607 A1 | 2/2016 | McCoy |

(56) References Cited

U.S. PATENT DOCUMENTS

| | | |
|---|---|---|
| 2016/0071397 A1 | 3/2016 | Logan |
| 2016/0096114 A1 | 4/2016 | Van Winkle |
| 2016/0189444 A1 | 6/2016 | Madhok |
| 2016/0199730 A1 | 7/2016 | Olson |
| 2016/0206955 A1 | 7/2016 | Goslin |
| 2016/0206957 A1 | 7/2016 | Goslin |
| 2016/0216854 A1 | 7/2016 | McClellan |
| 2016/0224939 A1 | 8/2016 | Chen |
| 2016/0299567 A1 | 10/2016 | Crisler |
| 2016/0310839 A1 | 10/2016 | Leyland |
| 2016/0313792 A1 | 10/2016 | Siegel |
| 2016/0346704 A1 | 12/2016 | Wagner |
| 2017/0021273 A1 | 1/2017 | Rios |
| 2017/0021282 A1 | 1/2017 | Comploi |
| 2017/0045946 A1 | 2/2017 | Smoot |
| 2017/0050743 A1 | 2/2017 | Cole |
| 2017/0068311 A1 | 3/2017 | Evans |
| 2017/0072316 A1 | 3/2017 | Finfter |
| 2017/0078621 A1 | 3/2017 | Sahay |
| 2017/0103571 A1 | 4/2017 | Beaurepaire |
| 2017/0106288 A1 | 4/2017 | Reiche |
| 2017/0132334 A1 | 5/2017 | Levinson |
| 2017/0154024 A1 | 6/2017 | Subramanya |
| 2017/0158023 A1 | 6/2017 | Stevanovic |
| 2017/0166221 A1 | 6/2017 | Osterman |
| 2017/0203205 A1 | 7/2017 | Nelson |
| 2017/0236130 A1 | 8/2017 | Kee |
| 2017/0236328 A1 | 8/2017 | Eatedali |
| 2017/0253252 A1 | 9/2017 | Donnelly |
| 2017/0270502 A1 | 9/2017 | Finbow |
| 2017/0300999 A1 | 10/2017 | Wilkinson |
| 2017/0330034 A1 | 11/2017 | Wang |
| 2017/0344754 A1 | 11/2017 | Kumar |
| 2017/0352185 A1 | 12/2017 | Bonilla Acevedo et al. |
| 2018/0008894 A1 | 1/2018 | Sack |
| 2018/0011988 A1 | 1/2018 | Ziegler |
| 2018/0040162 A1 | 2/2018 | Donnelly |
| 2018/0040163 A1 | 2/2018 | Donnelly |
| 2018/0043272 A1 | 2/2018 | Van Winkle |
| 2018/0089900 A1 | 3/2018 | Rober |
| 2018/0089901 A1 | 3/2018 | Rober |
| 2018/0096501 A1 | 4/2018 | Anderson |
| 2018/0181412 A1 | 6/2018 | Paratey |
| 2018/0231973 A1 | 8/2018 | Mattingly |
| 2018/0247352 A1 | 8/2018 | Rogers |
| 2018/0247364 A1 | 8/2018 | Nakadai |
| 2018/0342001 A1 | 11/2018 | Chavarria |
| 2018/0369702 A1 | 12/2018 | Hake |
| 2019/0001987 A1 | 1/2019 | Kim |
| 2019/0014070 A1 | 1/2019 | Mertvetsov |
| 2019/0047498 A1 | 2/2019 | Alcaidinho |
| 2019/0065970 A1 | 2/2019 | Bonutti |
| 2019/0075437 A1 | 3/2019 | Shaikh |
| 2019/0101976 A1 | 4/2019 | Reichow |
| 2019/0157607 A1 | 5/2019 | Kim |
| 2019/0220674 A1 | 7/2019 | Khalfan |
| 2019/0299105 A1 | 10/2019 | Knight |
| 2019/0385213 A1 | 12/2019 | Pande |
| 2020/0005284 A1* | 1/2020 | Vijayan ............... H04L 9/3247 |
| 2020/0053400 A1 | 2/2020 | Chao |
| 2020/0074181 A1 | 3/2020 | Chang |
| 2020/0151768 A1 | 5/2020 | Dekeyser |
| 2020/0163616 A1 | 5/2020 | Sakaya |
| 2020/0193163 A1 | 6/2020 | Chang |
| 2020/0376387 A1 | 12/2020 | Packin |
| 2021/0016184 A1 | 1/2021 | Kalama |
| 2021/0056762 A1 | 2/2021 | Robbe |
| 2021/0217026 A1 | 7/2021 | Hassani |
| 2021/0256070 A1 | 8/2021 | Bao |
| 2021/0284088 A1 | 9/2021 | Yamaguchi |
| 2021/0287195 A1 | 9/2021 | Prakash |
| 2022/0004600 A1 | 1/2022 | Bangole |
| 2022/0069996 A1 | 3/2022 | Xue |
| 2022/0148268 A1 | 5/2022 | Yilanci |
| 2022/0248072 A1 | 8/2022 | Gupta |
| 2022/0258059 A1 | 8/2022 | Murcin |
| 2022/0266148 A1 | 8/2022 | Koch |
| 2023/0036724 A1 | 2/2023 | Khalfan |
| 2023/0052381 A1 | 2/2023 | Khalfan |
| 2023/0142101 A1 | 5/2023 | Hirasawa |
| 2024/0152909 A1 | 5/2024 | Khalfan |

FOREIGN PATENT DOCUMENTS

| | | |
|---|---|---|
| JP | 2019065430 | 4/2019 |
| WO | 2007101785 A1 | 9/2007 |
| WO | 2018128946 A1 | 7/2018 |

OTHER PUBLICATIONS

Lambros Sarakis, et al., Technological Educational Institute of Sterea Ellada; Hellenic Open University; Synelixis Solutions Ltd., Providing Entertainment Applications in VANET Environments, Mar. 2, 2016 [https://ieeexplore.ieee.org/document/7422403] (8 pages).

Raman Mehta, IDG Communications, Inc., Augmented Reality—Next Frontier for Competitive Advantage, Feb. 14, 2017 [https://www.cio.com/article/3169685/augmented-reality-next-frontier-for-competitive-advantage.html], (5 pages).

"Sun CriesSun Cries", http://web.archive.org, Mar. 9, 2012 (Mar. 9, 2012), XP055152538, Retrieved from the Internet: URL: http://web.archive.org/web/20120309212642/http://www.suncries.com/skylanders-hacking [retrieved on Nov. 12, 2014] (8 pgs).

Kloster, Benjamin, 'Wanted: Encryption Scheme for Copy Protection Purposes', Retrieved from the Internet http://stackoverflow.com/questions/14529732/wanted-encryption-scheme-for-copy-protection-purposes, Jan. 25, 2013, XP055152568, 2 pages.

Dagamant, 'Skylanders Hacking', Retrieved from the Internet http://web.archive.ora/web/20120309212642/http://www.suncries.com/skvlaners-hacking Feb. 27, 2012, XP055152538, 8 pages.

Extended European Search Report issued in European Patent Application No. 14175300.4, dated Nov. 19, 2014. (6 pgs).

"Video Game/ Battle Circuit", TV Tropes, available at «https://web.archive.org/web/20150114005112/http://tvtropes.org/pmwiki/pmwiki.php/VideoGameBattleCircuit» (4 pages).

"Battle Circuit", Capcom, available at «https://web.archive.org/web/20000111073021/http://www.capcom.co.jp/newproducts/arcade/battle/bs-top.html» (Orig in al Japanese web page followed by English translation), 4 pages.

Apple (Developing Wireless CarPlay System, https://developer.apple.com/videos/play/wwdc2017/717/WWDC 2017, video and slide). (Year: 2017).

NPX "Software-Apple-Carplay: Software Technology for CarPlay", https://www.nxp.com/design/software/embedded-software/software-technology-for-carplay:SOFTWARE-APPLE-CARPLAY (Year: 2020), 3 pages.

Google search "Iphone Figurine" (Year: 2020), 1 page.

https://maiarlaunchpad.com/holoride_Litepaper_V2.1_Nov21.pdf, pp. 1-26.

https://www.ibm.com/downloads/cas/M8AOGADZ, 2018, pp. 1-8. IBM Institute for Business Value, Blockchain for mobility services https://www.ibm.com/downloads/cas/M8AOGADZ ; Jan. 2018 (8 pages).

Holoride, "Adding Thrill to Every Ride" Conceptual Litepaper V.2.1; https://maiarlaunchpad.com/holoride_Litepaper_V2.1_Nov21.pdf ; Nov. 2021 (26 pages).

Lucas Caciolo; "Decentralized theme parks promise kids virtual prizes to earn as they learn"; forkast; Jun. 29, 2021 (4 pages).

Cory Himel; "Developers can use gamification"; Gigster, Mar. 16, 2022 (5 pages).

"Dubai parks, etisalat to create an integrated smart theme park"; Gulf News; Jan. 13, 2016 (2 pages).

Adelyn Zhou; "The Next Wave of NFTs will be Dynamic"; Nasdaq; Mar. 29, 2021 (8 pages).

Charlotte Coates; "NFTs: the next big thing for the attractions industry"; Sep. 21, 2021 (14 pages).

"The Aeternals: New NFT and Interactive Technology"; Business Wire; Mar. 2, 2022 (3 pages).

(56) References Cited

OTHER PUBLICATIONS

"Dynamic NFTs for each player in the 2022 NBA Playoffs"; The Association NFT; https://theassociationnft.com/#/ ; 2022 (5 pages).
"What is a dynamic NFT"; Chainlink; https://blog.chain.link/what-is-a-dynamic-nft/ ; Apr. 7, 2022 (10 pages).
Dobbins et al. "Creating Human Digital Memories for a Richer Recall of Life Experiences" 2013 10th IEEE Internaional Conference on Networking, Sensing and Control, pp. 246-251 (Year: 2013).
Olsson et al. "User-Centered Design of a Mobile Application for Sharing Life Memories," Proceedings of the 4th international conference on mobile technology, applications, and systems and the 1st international symposium on Computer human interaction in mobile technology—Mobility '07, pp. 524-531, (Year: 2007).
Manzoor et al., "Scavenger Hunt: Utilization of Blockchain and IoT for a Location-Based Game," 2020, IEEE. Retrieved from <https://ieeexplore.ieee.org/stamp/stamp.jsp?tp=&arnumber=9253568&tag=1>c on Oct. 18, 2024. (Year: 2020).

\* cited by examiner

SYSTEMS AND METHODS FOR EFFECTUATING REAL-WORLD OUTCOMES BASED ON DIGITAL ASSETS OF USERS

CROSS-REFERENCE TO RELATED APPLICATIONS

This application claims priority benefit of the U.S. Provisional Patent Application No. 63/284,484 titled, "SYSTEMS AND METHODS FOR EFFECTUATING REAL-WORLD OUTCOMES BASED ON NON-FUNGIBLE TOKENS OF USERS," filed on Nov. 30, 2021. The subject matter of this related application is hereby incorporated herein by reference.

FIELD OF THE DISCLOSURE

The present disclosure relates to systems and methods for effectuating real-world outcomes based on digital assets of users.

BACKGROUND

Users may own a plurality of digital assets, such as non-fungible tokens. Proof of ownership of the digital assets may not present immediate benefits that the users or other users around them can tangibly or visually experience.

SUMMARY

One aspect of the present disclosure relates to a system configured to effectuate real-world outcomes based on digital assets of users. The digital assets may be maintained by decentralized ledger(s), thereby recording ownership of the digital assets and entities they are correlated with. Furthermore, such ownership may be immutable unless owners of the digital assets initiate transactions to change the ownership and such transactions are recorded on the decentralized ledger. The digital assets owned by the users and experience information correlated to the digital assets may be based on and thus represent real-world experiences of the users. That is, as the users experience the real-world experiences, the experience may be updated. The digital assets may be determined and subsequently the basis of real-world outcomes that may occur and be experienced by the users. Thus, individual users/owners may affect tangible and/or visual real-world outcomes by way of their digital assets that represent their own real-world experiences.

The system may include a user management component, one or more hardware processors configured by machine-readable instructions, electronic storage, decentralized ledger server(s), and/or other components.

The user management component may be configured to manage user information of users. The user information may include access information, addresses recorded on a decentralized ledger and included in digital wallets associated with the users, identifying information of the users, and/or other information. By way of non-limiting example, first user information of a first user may be managed. The first user information may include access information, a first address recorded on the decentralized ledger and included in a first digital wallet associated with the first user, first identifying information of the first user, and/or other information.

The decentralized ledger may record transactions that include digital assets and the addresses such that the users own the digital assets. The digital assets may be correlated with entities.

The electronic storage may be configured to store experience information corresponding with individual digital assets.

The machine-readable instructions may include one or more instruction components. The instruction components may include computer program components. The instruction components may include one or more of an authentication component, an asset determination component, an experience component, an outcome effectuation component, and/or other instruction components.

The authentication component may be configured to receive an authentication request from the first user. The authentication request may include authentication information for the first user. The authentication component may be configured to determine whether the authentication information is valid by comparing the first authentication information and the first access information.

The asset determination component may be configured to determine, responsive to determination that the first authentication information is valid, one or more of the digital assets indicated by the first digital wallet as owned by the first user.

The experience component may be configured to determine one or more real-world experiences of the first user. The experience component may be configured to update the experience information, correlated to the one or more digital assets owned by the first user as indicated by the first digital wallet, in the electronic storage based on the one or more real-world experiences.

The outcome effectuation component may be configured to effectuate real-world outcomes based on the experience information correlated with the one or more digital assets owned by the first user as indicated by the first digital wallet that are owned by the first user.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
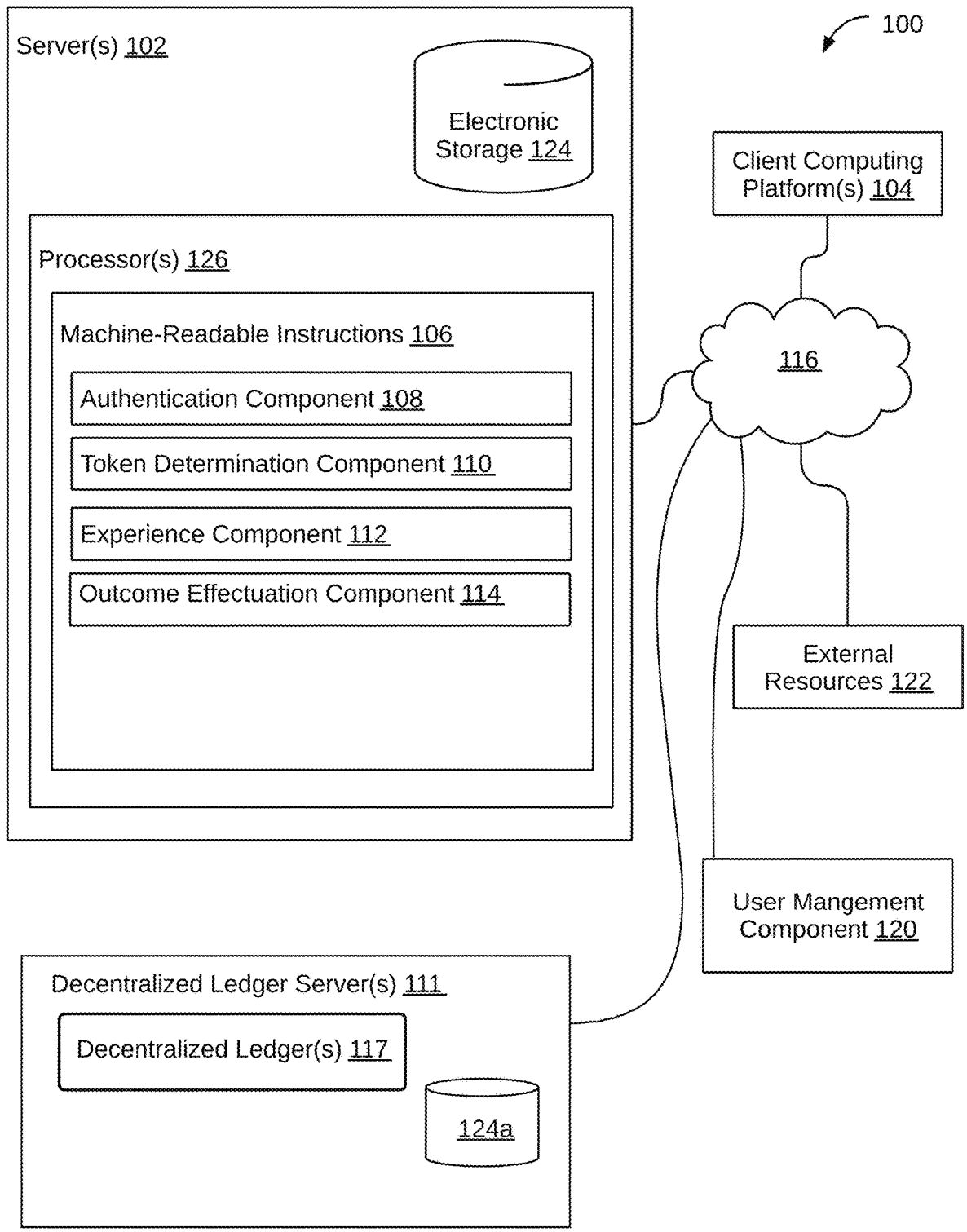
FIG. 1 illustrates a system configured to effectuate real-world outcomes based on digital assets of users, in accordance with one or more implementations.

FIG. 1 illustrates a system 100 configured for effectuating real-world outcomes based on digital assets of users, in accordance with one or more implementations. In some implementations, system 100 may include user management component 120, one or more servers 102, electronic storage 124, decentralized ledger server(s) 111, and/or other components. Electronic storage 124a may be similar to electronic storage 124 as described elsewhere in this disclosure, though included in decentralized ledger server(s) 111 as depicted in FIG. 1.

As used herein, the term "digital asset" may refer to a serial code tracked on one or more decentralized ledgers. The digital assets may be uniquely identified and/or uniquely identifiable. As used herein, rights pertaining to digital assets may be tracked, recorded, and/or otherwise registered on one or more decentralized ledgers. As such, an individual digital asset may be a ledger-tracked digital asset.

Individual digital assets may be correlated with another entity (which may be referred to as a "correlated entity") by virtue of technology provided and/or supported by the one or more decentralized ledgers on which the rights pertaining to the individual digital assets are tracked (including but not limited to smart contracts and/or other executable code on the one or more permanent registries). Accordingly, rights pertaining to a digital asset may correlate to the provision of one or more rights (e.g., accessibility) with respect to the correlated entity (e.g., control and/or other accessibility). Transactions involving a digital asset recorded on a decentralized ledger may correlate to certain transactions (or modifications) of the correlated entity, and/or vice versa.

Various types and/or combinations of correlated entities are envisioned within the scope of this disclosure, including but not limited to physical and/or virtual objects, content, items, rights, memberships, grants, etc. The use of the singular "entity" or "correlated entity" is not intended to be limiting, as multiple different objects, content, items, rights, memberships, grants, etc. may be correlated to a single digital asset. By way of non-limiting example, a correlated entity may be a physical item (e.g., artwork, a ticket to an event), a subscription to certain media content, content and so forth. The content may include an image, a video, a graphic image file, a signature of notoriety, a sound bite of an audio file, the audio file, and/or other content. In some implementations, the correlated entity may refer to any item or object related to art and entertainment for which a user may use, own, sell, trade, loan, destroy, and/or otherwise effectuate a change of ownership, access, or control (including exchanges through challenges).

A digital asset may be fungible if it is functionally and/or physically indistinguishable from another digital asset. A digital asset may be non-fungible if it is unique, or one-of-a-kind. For example, a specific individual may be non-fungible. A digital asset may be semi-fungible if there is a set of a limited number of similar but distinguishable digital assets. For example, a limited amount of images of a sports team for a particular year may be semi-fungible. For example, a digital ticket to a show, concert, exhibition, and/or other event may be semi-fungible. The semi-fungible digital assets are considered as unique, "not fungible", or non-fungible digital assets. In some implementations, the digital assets may include non-fungible tokens, fungible tokens, semi-fungible tokens, and/or other digital assets. Decentralized ledger server(s) 111 may be used to implement one or more decentralized ledger(s) 117. In some implementations, one or more decentralized ledger(s) 117 may be decentralized and/or immutable registries or ledgers. In some implementations, decentralized ledger(s) 117 may be one or more databases on which rights pertaining to the individual digital assets are tracked and/or recorded. In some implementations, decentralized ledger(s) 117 may be maintained by distributed computing platforms (not shown in FIG. 1). In some implementations, a distributed computing platform may be implemented by a set of client computing platforms and/or servers (including, for example, one or more decentralized ledger server(s) 111). In some implementations, client computing platform(s) 104 may be the distributed platform(s). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of decentralized ledger(s) 117. The smart contracts may be stored on decentralized ledger(s) 117 and/or another decentralized ledger. In some implementations, the distributed computing platform may be the EOSIO platform. In some implementations, the distributed computing platform may be similar to or based on the EOSIO platform. In some implementations, the distributed computing platform may be Ethereum. In some implementations, the distributed computing platform may be similar to or based on Ethereum. In some implementations, the virtual machine may be a decentralized virtual machine.

In some implementations, at least one of the decentralized ledger(s) 117 implemented by decentralized ledger server(s) 111 is a private permissioned decentralized ledger. The private permissioned decentralized ledger may be configured to record information, record the transactions, and/or track addresses (e.g., corresponding to/included in digital wallets, smart contracts, etc.). The transactions recorded on decentralized ledger(s) 117 may include the digital assets and the addresses, thus proving or indicating that the users own the digital assets. The recorded information may pertain to one or more digital assets recorded on decentralized ledger(s) 117. The recorded information may include ownership of the digital assets and/or other assets. For example, ownership rights and/or other rights may be modified. In some implementations, a digital asset may be removed from one decentralized ledger and added or recorded on another decentralized ledger. In some implementations, at least one of the decentralized ledger(s) 117 implemented by decentralized ledger server(s) 111 is a public decentralized ledger. The public decentralized ledger may be configured to be part of either EOSIO mainnet, Ethereum mainnet, Ethereum 1.5, Ethereum 2.0, a derivative of Ethereum 2.0 that is configured to perform transactions of Ether (ETH) between accounts, or a derivative of EOSIO that is configured to perform transactions of EOS between different accounts.

Elements of decentralized ledger(s) 117 ledger may be grouped together in units that are referred to as blocks. For example, an individual block may include one or more digital assets (e.g., digital assets) and/or one or more transactions related to the one or more digital assets. For example, an individual block may be linked to one or more other individual blocks. Individual blocks may be linked or chained together to form a structure of blocks and/or a hierarchy of blocks, such as, e.g., a chain of blocks. An individual block may include one or more assets (e.g., digital assets), one or more transactions, and/or other information.

In some implementations, an individual decentralized ledger server(s) 111 may be dedicated to a particular node of a decentralized ledger(s) 117. Typically, different nodes are included in (or implemented by, or hosted by) different servers or different computer systems to increase the safety and security of transactions on a decentralized ledger and/or blockchain. The consensus protocol used for a particular blockchain will be harder to falsify or circumvent when the different nodes are in different geographical locations, on different types of computing platforms, and/or otherwise distributed and diverse.

In some implementations, one or more decentralized ledger(s) 117 implemented by decentralized ledger server(s) 111 may be publicly accessible. In some implementations, one or more decentralized ledger(s) 117 implemented by decentralized ledger server(s) 111 may be private and/or permissioned. In some implementations, one or more decentralized ledger(s) 117 implemented by decentralized ledger server(s) 111 may be append-only. In some implementations, existing blocks and/or nodes of one or more decentralized ledger(s) 117 implemented by decentralized ledger server(s) 111 can substantially not be altered or deleted, unless multiple copies are altered. This is unlikely to happen provided that the multiple copies stored on different computing platforms, e.g., in different geographical locations, in accordance with the relevant consensus protocol(s). Decentralized ledger(s) 117 may be replicated on multiple computing platforms, preferably in multiple different geographical locations. Additionally, individual blocks and/or nodes may be linked together in a manner that prevents tampering, such as using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, individual nodes, transactions, and/or assets may be digitally signed in a manner that proves integrity and/or prevents tampering, e.g., by providing authentication, as well as repudiation.

Electronic storage 124 may be configured to store experience information correlated with individual digital assets. In some implementations, the experience information may include records of the real-world experiences. The records may include one or more of the content to represent the individual real-world experiences and/or details that define the individual real-world experiences. The details may include a color, a time, a theme, a character name, a food name, an occasion, a virtual space, and/or other details. In some implementations, the individual digital assets, and thus the experience information, may be related to a particular experience type. In some implementations, by way of non-limiting example, the experience type may include ride attractions, consumptions (e.g., one or more dishes, snacks, beverages, etc.), characters (e.g., photos/videos with characters, interactions with characters, etc.), games, purchases (e.g., one or more physical items from a store), content viewings (e.g., one or more shows, movies, viewpoints, presentations, live performances, sporting events, etc.), and/or other experience types. The real-world experiences may include dining at a particular restaurant, shopping at a particular store, visiting a particular site (e.g., historical site, museum), completing competitions (e.g., a city-specific marathon), playing or competing in a virtual or real-world game, viewing a particular presentation (e.g., movie, conference), viewing a live performance or competition (e.g., a play, a concert, a sporting event), reaching a viewpoint, and/or other real-world experiences. In some implementations, the real-world experiences may be within a virtual reality (VR), augmented reality (AR), or mixed reality (MR) environment. The real-world experiences may include interacting with one or more digital representations of real-world and/or fictional entities within a virtual space of the VR, AR, or MR environment. The real-world experiences may be depicted in individual virtual and/or game spaces that can be experienced by any number of users synchronously and persistently, while providing continuity of information such as personal identity, user history, entitlements, possessions, payments, and the like. In some implementations, one of the real-world experiences may be playing within, competing within, or otherwise interacting within the VR/AR/MR environments. As used herein, the term "virtual environment" may refer to a virtual reality environment, an augmented reality environment, or a mixed reality environment.

The VR/AR/MR environments may be accessible by users via virtual reality devices, including but not limited to, game consoles, VR/AR/MR headsets and accessories, desktop computers, laptop computers, tablets, and/or other devices. In some implementations, the virtual reality devices may be personally owned and in possession of the users. In some implementations, the virtual reality devices may be at a location for the users to utilize.

User management component 120 may be configured to manage user information of the users. The user information may include access information, addresses recorded on a decentralized ledger(s) 117 and included in digital wallets associated with the users, identifying information of the users, and/or other information. The access information may facilitate identity verification of individual ones of the users against authentication information received (by authentication component 108 described herein). The identity verification of the individual users may facilitate verification of a digital wallet associated with the individual users. Individual ones of the digital wallets may include a private key, a public key, an address generated based on the public key and a hash function, and/or other information. The private key may provide or authorize the user, or anyone who possesses the private key, with access to consideration sent to the address. The private key may authorize and initiate transactions of the consideration from the address. The consideration, by way of non-limiting example, may include currency, cryptocurrency, digital assets, and/or other consideration.

The access information may include biometric information, a passcode, a password, a pass phrase, information identical to the information conveyed by the output signals and/or other access information that facilitate with verifying the identity of the users.

The biometric information may include a fingerprint, a retinal pattern, a hand scan, a face scan, voice, DNA sample, and/or other biometric information. The passcode, the password, and the pass phrase may be set by the individual users or assigned to the individual users. The identifying information may identify the users, and in some implementations, facilitate in verifying the identity of the users. The identifying information for a given user may include a name, a birthdate, a mailing address, an email address, a username, a membership number, and/or other identifying information.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of authentication component 108, asset determination component 110, experience component 112, outcome effectuation component 114, and/or other instruction components.

Authentication component 108 may be configured to receive individual authentication requests that include authentication information for individual users. The authentication requests may indicate the users' participation in the individual real-world experiences at individual locations. The authentication information may facilitate identity verification of the individual users. The identity verification of the individual users may facilitate the verification of the digital wallet associated with the individual users. The authentication information may include user input from a personal computing platform (similar to client computing platform 104) associated with a user, output signals based on a physical item associated with the user, biometric information of the user, and/or other authentication information. In some implementations, more than one of the authentication information may be received. In some implementations, one of the authentication information may be received.

The user input may include an input passcode, an input password, an input pass phrase, and/or other user input. The output signals may either convey validity or invalidity of the identity of the user. In some implementations, the output signals may convey a particular passcode, a particular password, a particular pass phrase, a particular identifier (e.g., a user identification number), and/or other information that facilitates identity verification of the user. In some implementations, the particular passcode, the particular password, and/or the particular pass phrase may be the same as the input passcode, the input password, and/or the input pass phrase received as the user input.

In some implementations, the physical items may be configured to generate primary output signals. By way of non-limiting example, the physical item may include the personal computing platform (e.g., smartphone, tablet, portable computer, a smart watch), a fob, a key card, a machine-readable optical code (e.g., quick response (QR) code, bar code), and/or other physical items that include radio frequency identification (RFID) and/or are configured to generate the primary output signals. In some implementations, the personal computing platform may include and be configured to display the machine-readable optical code. In some implementations, the machine-readable optical codes may include the particular passcode, the particular password, and/or the particular pass phrase, the biometric information, the identifying information, the addresses, and/or other information. The output signals received by authentication component 108 may be the primary output signals. In some implementations, such output signals may be received by authentication component 108 upon the physical item being in close proximity to the individual locations of the individual real-world experiences. Close proximity of the physical item may include within 5 feet, within 3 feet, within 2 inches, and/or other amount of distance.

In some implementations, the output signals received by authentication component 108 may be generated by item sensor(s). In some implementations, the item sensor(s) may be included in or coupled with client computing platform 104 associated with the individual real-world experiences at the individual locations. In some implementations, the item sensor(s) may be included in or associated with the individual locations. The item sensor(s) may be configured to receive the primary output signals from the physical item and generate the output signals based on the primary output signals from the physical item. In some implementations, the primary output signals may be received by the item sensor(s) upon the physical item entering the location or the physical item being in close proximity of the location and/or the item sensor(s). In some implementations, the physical item, such as the fob, may be included within another object. For example, the object may include a toy (e.g., a figurine, a stuffed animal), a headwear piece, a jewelry piece, a pin, a wristband, and/or other object.

In some implementations, the item sensor(s) and/or other sensors may be configured to receive the biometric information from the user. In some implementations, the item sensor(s) may be configured to generate secondary output signals representative of the biometric information and transmit the secondary output signals to authentication component 108. In some implementations, the item sensor(s) may be configured to transmit the biometric information to authentication component 108. In some implementations, the item sensor(s) and/or other sensors may be configured to scan or recognize machine-readable optical codes. Thus, the information included in the machine-readable optical codes may be conveyed upon recognition.

Authentication component 108 may be configured to determine whether the authentication information is valid or invalid. The authentication information determined as valid may indicate the identity of the individual user is verified. The authentication information determined as invalid may indicate the identity of the individual user is unverified. In some implementations, the determination of whether the authentication information is valid or invalid may include comparing the authentication information with the access information. Comparing the authentication information with the access information may include determining whether the authentication information is the same as the access information, whether a majority of the authentication information is the same as the access information, and/or other techniques to determine whether the authentication information and the access information verify the identities of the users or not. For example, determining whether the authentication information is valid may include determining whether the particular password input by the user or the particular passcode conveyed by the output signals are the same as the password or the passcode included in the access information, respectively.

Responsive to determination that the authentication information is valid, asset determination component 110 may be configured to determine one or more of the digital assets indicated by the individual digital wallets as owned by the individual users. That is, based on the validated authentication information and the user information which includes the access information that the authentication information is compared to, the appropriate digital wallets for the individual users may be determined, and thus the addresses tracked by decentralized ledger(s) 117 that indicate ownership of the digital assets.

Experience component 112 may be configured to determine one or more real-world experiences of the individual users. The one or more real-world experiences may be determined subsequent to the authentication information being received and verified at the locations by client computing platform 104 and/or by the item sensor(s) at the locations. That is, upon determination that the user is at a given location and their identity is verified, the one or more real-world experiences may be determined for recordation to the experience information. Recordation may enable one or more real-world outcomes to occur for the individual users to view or experience, where the real-world outcomes are influenced by the real-world experiences.

Experience component 112 may be configured to update the experience information correlated with the one or more digital assets based on the one or more real-world experiences. Updating the experience information may include adding a record of individual ones of the real-world experiences to respective experience information. Individual ones of the real-world experiences may be associated with particular ones of the content and values to the details such that the records added responsive to each of the real-world experiences of the users include the particular ones of the content and the values to the details.

Outcome effectuation component 114 may be configured to effectuate real-world outcomes for one or more of the users. Effectuating the real-world outcomes may include determining the experience information and analyzing the real-world experiences that the experience information characterizes. The effectuation may be based on the experience information in electronic storage 124 that is correlated with the one or more digital assets associated with the one or more users. In some implementations, the real-world outcomes may be collaborative or particular to the individual users. The collaborative real-world outcomes may be based on the experience information correlated with the digital assets that are associated with a plurality of the users at a particular location and/or at a particular time. For example, the plurality of the users may be in a particular location (e.g., a ride attraction, a parade route, a show venue). The real-world outcomes that are particular the user may be based on the one or more digital assets and the correlated experience information that are associated with the user. By way of non-limiting example, the real-world outcomes may include one or more of a particular light color, a sound effect, a special effect, digital visual content, a visual presentation theme, a color of a food, a flavor of the food, a set of foods on a menu, a character appearance, and/or other real-world outcomes. The visual presentation theme may be for a parade, printed content, the food, an animation, and/or visual presentations.

Individual digital assets may be obtained, earned, or otherwise collected by the users in various manners. In some implementations, new single digital assets correlated with special information and visuals to represent the real-world outcomes may be minted and subsequently granted to the user/participant upon experiencing the individual real-world outcomes. In some implementations, new single digital assets correlated with special information and visuals to represent a given real-world experience may be minted and subsequently granted to the user/participant with a highest score, most effort, and/or other qualifications as indicated by the experience information correlated with their digital asset. The accomplishment of the qualifications may be determined based on analysis of the experience information. As used herein, the term "mint" or variations thereof may refer to performance, initiating, and/or execution of the process(es), transaction(s), procedure(s), operation(s), and/or step(s) that result in the instantiation of a given digital asset, including the establishment of ownership, recordation of the ownership on decentralized ledger(s) 117, definition of appearance of the given digital asset (e.g., a selected representative image, a default image), and/or other functions. In some implementations, minting the given digital asset may include building an executable program that instantiates the given digital asset. The executable program may be transmitted to a distributed computing platform(s) capable of executing the program.

In some implementations, every user may be given a digital asset related to their real-world experience (e.g., a cruise). Throughout a day or set of days, the users may interact with Internet of Things (IoT)-connected physical objects or complete digital tasks on their client computing platform 104. As a result, the experience information correlated with their digital asset may be updated with interactions related to the real-world experience both with detailed information (e.g., name of excursion) as well as visually (e.g., photo of the excursion). As the day culminates and, for example, the user proceeds to their dining experience, client computing platform 104 associated with the user may automatically be sensed by the item sensor(s) such that the authentication information is received to facilitate determining their digital asset, and a real-world outcome may be effectuated such that portions of the dining experience may be customized based on their experience information.

For example, Bobby may want to participate in a smuggler quest. He and 99 other participants/users may be together trying to complete tasks to influence an upcoming parade through a location (e.g., an amusement park). If they are successful, the parade may showcase heroes from a movie, show, story, or franchise during a key part of the performance. But if unsuccessful, the parade may feature villains from the movie, show, story, or franchise during that time. As Bobby completes tasks, the experience information correlated with his digital asset may update with the relevant information (e.g., a particular task, a score), and may include an accompanying digital image that evolves as he progresses through the tasks. At the end of the smuggler quest, all participants' experience information correlated with their digital assets may be analyzed and verified digitally, and the parade may be influenced (i.e., the real-world outcome) based on all the experience information of those digital assets. The experience information correlated with the digital assets may be further updated to reflect the parade result that is the real-world outcome by way of information (e.g., names of characters featured) as well as by updating the digital image. Following the parade, Bobby and the rest of the participants may keep/own their digital assets as memorabilia, and they may have the ability to optionally sell or otherwise transfer the digital assets to other parties. In addition, in some implementations, a new single digital asset correlated with special information and visuals to represent the real-world outcome of the smuggler quest, may be minted. The newly minted digital asset may be granted to the user/participant with a highest score as indicated by the experience information correlated with their digital asset in comparison to the experience information correlated with the digital assets of the other users/participants.

In some implementations, server(s) 102, client computing platform(s) 104, and/or external resources 122 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 122 may be operatively linked via some other communication media.

A given client computing platform 104 may include one or more processors configured to execute computer program components. The computer program components may be configured to enable an expert or user associated with the given client computing platform 104 to interface with system 100 and/or external resources 122, and/or provide other functionality attributed herein to client computing platform (s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 122 may include sources of information outside of system 100, external entities participating with system 100, and/or other resources. In some implementations, some or all of the functionality attributed herein to external resources 122 may be provided by resources included in system 100.

Server(s) 102 may include electronic storage 124, one or more processors 126, and/or other components. Server(s) 102 may include communication lines, or ports to enable the exchange of information with network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 124 may comprise non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from client computing platform(s) 104, and/or other information that enables server(s) 102 to function as described herein.

Processor(s) 126 may be configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor (s) 126 may be configured to execute components 108, 110, 112, and/or 114, and/or other components. Processor(s) 126 may be configured to execute components 108, 110, 112, and/or 114, and/or other components by software; hardware; firmware; some combination of software, hardware, and/or firmware; and/or other mechanisms for configuring processing capabilities on processor(s) 126. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 126 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 126 may be configured to execute one or more additional components that may perform some or all of the functionality attributed below to one of components 108, 110, 112, and/or 114.

Figure 3:
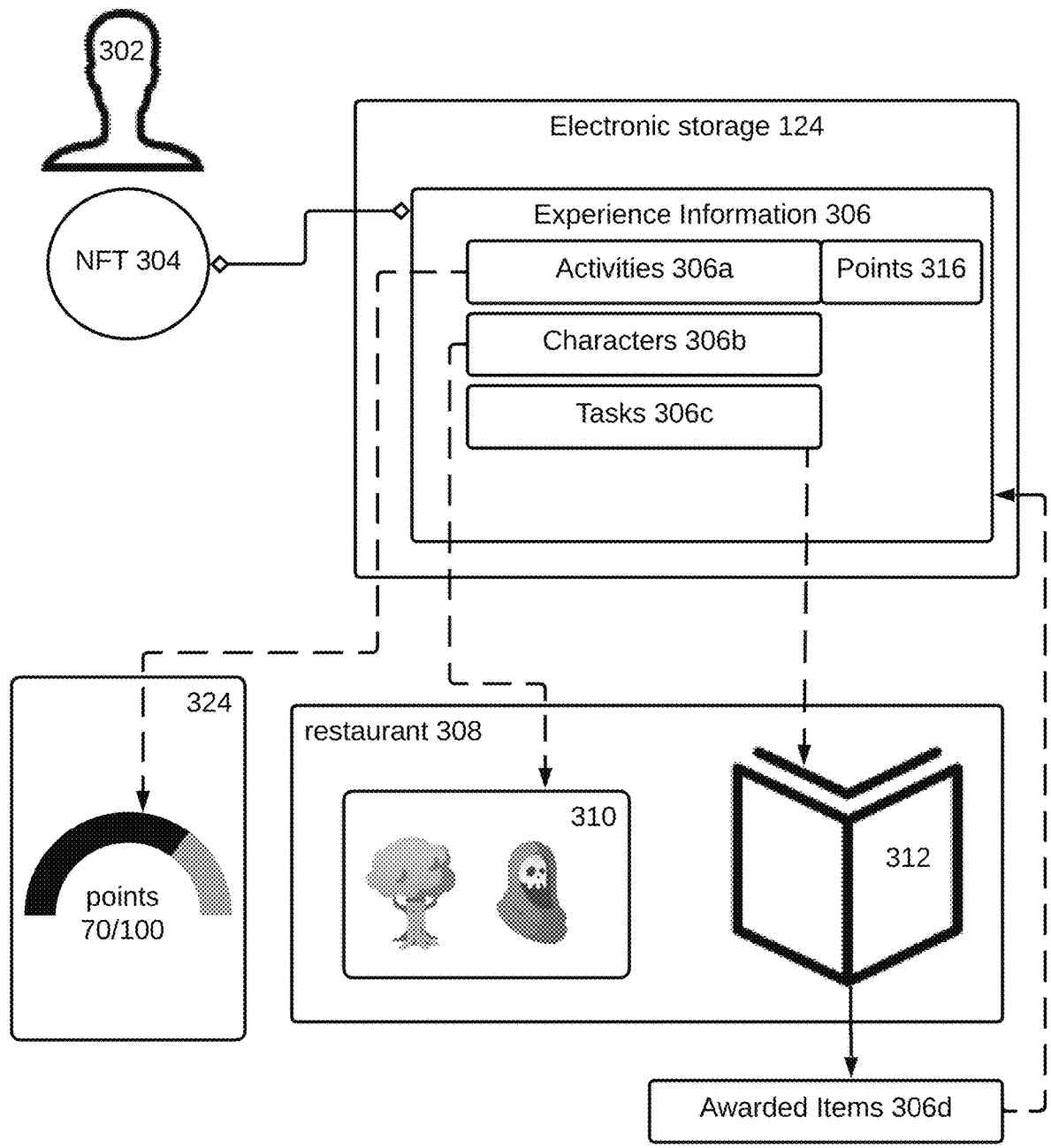
FIG. 3 illustrates an example implementation of a restaurant location that conveys real-world outcomes based on a digital asset of a user, in accordance with one or more implementations.

FIG. 3 illustrates a user 302 that may be aboard a cruise or at a particular location, and participate in activities related to a particular movie, show, story, or franchise throughout the day (i.e., real-world experiences). As they do so, experience information 306 correlated with their NFT 304 may update to reflect activities 306a that user 302 participated in, and user 302 may earn points 316 for each activity. In addition, experience information 306 correlated with NFT 304 may update visually to display their progress on collecting points 316. Experience information 306, such as points 316, correlated with NFT 304 may be visible on a device 324 (e.g., a smartphone, a wearable device, a tablet, etc.) associated with user 302.

As user 302 proceeds to dine in a restaurant 308 related to the particular movie, show, story, or franchise, a display screen 310 near their table may be customized, based on experience information 306, to show, for example, characters 306b they met throughout their day or the duration of their stay/visit (i.e., a real-world outcome based on experience information 306). In addition, since user 302 completed required tasks 306c (i.e., as indicated by experience information 306), their menu options 312 may be specialized, e.g., to include a bonus dessert that reflects their achievement (i.e., an additional real-world outcome). After their dining experience, experience information 306 correlated with NFT 304 may be updated to indicate that they successfully dined at restaurant 308 by including awarded items 306d. Awarded items 306d may include visual information (e.g., image) showing which dessert they were awarded, for example. User 302 may then take this NFT 304 and its correlated experience information subsequent to the cruise with them as memorabilia and/or transfer it to others (e.g., sell, trade, gift).

Figure 2:
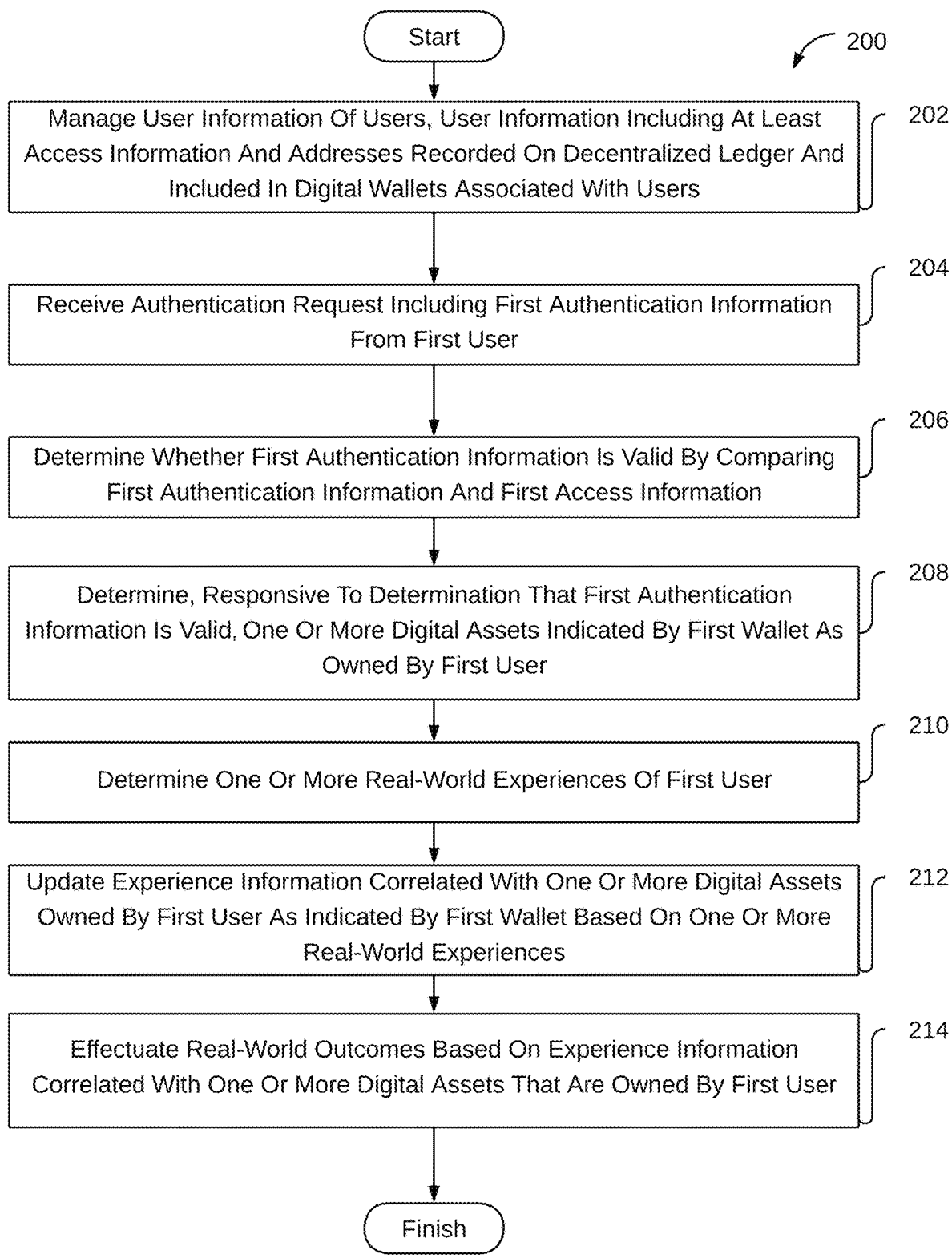
FIG. 2 illustrates a method to effectuate real-world outcomes based on digital assets of users, in accordance with one or more implementations.

FIG. 2 illustrates a method 200 for effectuating real-world outcomes based on digital assets of users, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include managing user information of users. The user information may include at least access information and addresses recorded on a decentralized ledger and included in digital wallets associated with the users. As such, first user information of a first user may be managed. The first user information may include access information, a first address recorded on the decentralized ledger and included in a first digital wallet associated with the first user, and first identifying information of the first user. Operation 202 may be performed by one or more hardware processors configured by machine-readable instructions including a component that is the same as or similar to user management component 120, in accordance with one or more implementations.

An operation 204 may include receiving an authentication request from the first user. The authentication request may include first authentication information for the first user. Operation 204 may be performed by one or more hardware processors configured by machine-readable instructions including a component that is the same as or similar to authentication component 108, in accordance with one or more implementations.

An operation 206 may include determining whether the first authentication information is valid by comparing the first authentication information and the first access information. Operation 206 may be performed by one or more hardware processors configured by machine-readable instructions including a component that is the same as or similar to authentication component 108, in accordance with one or more implementations.

An operation 208 may include determining, responsive to determination that the first authentication information is valid, one or more of digital assets indicated by the first digital wallet as owned by the first user. Operation 208 may be performed by one or more hardware processors configured by machine-readable instructions including a component that is the same as or similar to asset determination component 110, in accordance with one or more implementations.

An operation 210 may include determining one or more real-world experiences of the first user. Operation 210 may be performed by one or more hardware processors configured by machine-readable instructions including a component that is the same as or similar to experience component 112, in accordance with one or more implementations.

An operation 212 may include updating experience information correlated with the one or more digital assets owned by the first user as indicated by the first digital wallet based on the one or more real-world experiences. The experience information may be stored in electronic storage. Operation 212 may be performed by one or more hardware processors configured by machine-readable instructions including a component that is the same as or similar to experience component 112, in accordance with one or more implementations.

An operation 214 may include effectuating real-world outcomes based on the experience information, in the electronic storage, correlated with the one or more digital assets that are owned by the first user. Operation 214 may be performed by one or more hardware processors configured by machine-readable instructions including a component that is the same as or similar to outcome effectuation component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to effectuate real-world outcomes based on digital assets of users, the system comprising:
  electronic storage configured to store experience information correlated with individual digital assets, wherein the experience information includes first experience information correlated with a first digital asset;
  a user management component configured to manage user information of users, the user information including access information and identifying addresses on a decentralized ledger associated with individual ones of the users, wherein transactions between the addresses involving digital assets are recorded on the decentralized ledger, wherein the user information includes first user information of a first user, and wherein the first user information includes first access information of the first user and identifies a first address associated with the first user; and
  one or more processors configured by machine-readable instructions to:
    receive an authentication request from the first user, wherein the authentication request includes first authentication information for the first user;
    determine whether the first authentication information is valid by comparing the first authentication information and the first access information;
    responsive to a determination that the first authentication information is valid, analyze the transactions recorded on the decentralized ledger between the first address and one or more other ones of the addresses to identify any of the digital assets available at the first address, wherein the digital assets available at the first address include the first digital asset, wherein the first digital asset being available at the first address indicates the first digital asset is owned by the first user by virtue of the first address being associated with the first user;
determine one or more real-world experiences of the first user;
update the first experience information, in the electronic storage, correlated with the first digital asset owned by the first user as indicated by the transactions between the first address and the one or more other ones of the addresses recorded on the decentralized ledger based on the one or more real-world experiences; and
subsequent to updating the first experience information, effectuate a real-world outcome for the first user based on the first experience information correlated with the first digital asset owned by the first user, wherein the real-world outcome includes one or more of a particular light color, a sound effect, a special effect, digital visual content, a visual presentation theme, a color of a food, a flavor of the food, or a set of foods on a menu.

2. The system of claim 1, wherein the visual presentation theme is for a parade, printed content, the food and/or an animation.

3. The system of claim 1, wherein the first digital asset owned by the first user is related to a particular experience type, wherein the particular experience type includes a site visit, a purchase, a ride attraction, a character, a game, a content viewing, and/or a consumption, wherein the first experience information includes records of the one or more real-world experiences.

4. The system of claim 1, wherein the first authentication information includes user input from a client computing platform associated with the first user, an output signal based on a physical item associated with the first user, and/or biometric information of the first user.

5. The system of claim 4, wherein the physical item includes the client computing platform, a watch, a fob, and/or a key card.

6. The system of claim 1, further comprising a virtual reality device configured to enable generation of a virtual environment, wherein a first real-world experience of the one or more real-world experiences includes interacting with one or more digital representations of real-world and/or fictional entities within a virtual space of the virtual environment via the virtual reality device.

7. The system of claim 1, wherein the real-world outcome is based on the experience information that is correlated with one or more other ones of the digital assets that are owned by one or more other ones of the users such that the real-world outcome is effectuated for the first user and the one or more other ones of the users.

8. A method for effectuating real-world outcomes based on digital assets of users, the method comprising:
storing experience information correlated with individual digital assets, wherein the experience information includes first experience information correlated with a first digital asset;
managing user information of users, the user information including access information and identifying addresses on a decentralized ledger associated with individual ones of the users, wherein transactions between the addresses involving digital assets are recorded on the decentralized ledger, wherein the user information includes first user information of a first user, and wherein the first user information includes first access information of the first user and identifies a first address associated with the first user;
receiving an authentication request from the first user, wherein the authentication request includes first authentication information for the first user;
determining whether the first authentication information is valid by comparing the first authentication information and the first access information;
responsive to a determination that the first authentication information is valid, analyzing the transactions recorded on the decentralized ledger between the first address and one or more other ones of the addresses to identify any of the digital assets available at the first address, wherein the digital assets available at the first address include the first digital asset, wherein the first digital asset being available at the first address indicates the first digital asset is owned by the first user by virtue of the first address being associated with the first user;
determining one or more real-world experiences of the first user;
updating the first experience information, in the electronic storage, correlated with the first digital asset owned by the first user as indicated by the transactions between the first address and the one or more other ones of the addresses recorded on the decentralized ledger based on the one or more real-world experiences; and
subsequent to updating the first experience information, effectuating a real-world outcome for the first user based on the first experience information correlated with the first digital asset owned by the first user, wherein the real-world outcome includes one or more of a particular light color, a sound effect, a special effect, digital visual content, a visual presentation theme, a color of a food, a flavor of the food, or a set of foods on a menu.

9. The method of claim 8, wherein the visual presentation theme is for a parade, printed content, the food and/or an animation.

10. The method of claim 8, wherein the first digital asset owned by the first user is related to a particular experience type, wherein the experience type includes a site visit, a purchase, a ride attraction, a character, a game, a content viewing, and/or a consumption, wherein the particular experience information includes records of the one or more real-world experiences.

11. The method of claim 8, wherein the first authentication information includes user input from a client computing platform associated with the first user, an output signal based on a physical item associated with the first user, and/or biometric information of the first user.

12. The method of claim 11, wherein the physical item includes the client computing platform, a watch, a fob, and/or a key card.

13. The method of claim 8, wherein a first real-world experience of the one or more real-world experiences includes interacting with one or more digital representations of real-world and/or fictional entities within a virtual space of a virtual environment via a virtual reality device, wherein the virtual reality device is configured to enable generation of the virtual environment.

14. The method of claim 8, wherein the real-world outcome is based on the experience information that is correlated with one or more other ones of the digital assets that are owned by one or more other ones of the users such that the real-world outcome is effectuated for the first user and the one or more other ones of the users.

\* \* \* \* \*